(12) United States Patent
Liu et al.

(10) Patent No.: US 9,010,637 B2
(45) Date of Patent: Apr. 21, 2015

(54) WIRELESS RADIO FREQUENCY IDENTIFICATION RECEIVING FACILITY HAVING ANTENNA NET

(71) Applicants: Tai-Hwa Liu, Hsinchu (TW); Yi-Chun Sung, Hsinchu (TW)

(72) Inventors: Tai-Hwa Liu, Hsinchu (TW); Yi-Chun Sung, Hsinchu (TW)

( * ) Notice: Subject to any disclaimer, the term of this patent is extended or adjusted under 35 U.S.C. 154(b) by 295 days.

(21) Appl. No.: 13/772,542

(22) Filed: Feb. 21, 2013

(65) Prior Publication Data

US 2014/0231517 A1 Aug. 21, 2014

(51) Int. Cl.
*G06K 7/00* (2006.01)
*G06K 7/10* (2006.01)

(52) U.S. Cl.
CPC ................... *G06K 7/10356* (2013.01)

(58) Field of Classification Search
USPC ........................................................ 235/439
See application file for complete search history.

(56) References Cited

U.S. PATENT DOCUMENTS

| | | | | |
|---|---|---|---|---|
| 2006/0255949 | A1* | 11/2006 | Roeder et al. | 340/572.7 |
| 2009/0256680 | A1* | 10/2009 | Kilian | 340/10.1 |
| 2010/0019906 | A1* | 1/2010 | Kushida et al. | 340/572.1 |
| 2014/0015642 | A1* | 1/2014 | White | 340/10.1 |

* cited by examiner

*Primary Examiner* — Michael G Lee
*Assistant Examiner* — David Tardif
(74) *Attorney, Agent, or Firm* — Lin & Associates IP, Inc.

(57) ABSTRACT

A wireless radio frequency identification receiving facility having antenna net includes a receiving apparatus with receiving spaces for receiving objects, a leaking-waved antenna net unit, and a first antenna. The leaking-waved antenna net unit includes an inner main antenna and extension antennas extended to the regions adjacent to the receiving spaces. The first antenna receives the detecting signal from a reader unit and generates a current. The EM wave is generated while the current flows through the leaking-waved antenna net unit, and is transmitted along extension antennas. The radio frequency identification electronic tags on the objects are triggered by the electromagnetic field built up by the EM wave, and information of all objects in the receiving apparatus is read at one time, so that the checking time is greatly reduced and the possibility of lost and position mistake of object can be excluded.

14 Claims, 6 Drawing Sheets

WIRELESS RADIO FREQUENCY IDENTIFICATION RECEIVING FACILITY HAVING ANTENNA NET

BACKGROUND OF THE INVENTION

1. Field of the Invention

The present invention generally relates to a receiving facility, more specifically to a wireless radio frequency identification receiving facility having antenna net for reducing the checking time and labor cost.

2. The Prior Arts

Nowadays, as long as the magnitude of warehouse or amount of servers and cloud hosting increases recently, the costs for the equipments or staffs also increases greatly in regular checking and maintaining, such that the ultra high frequency detecting technology is developed for reducing the checking time and labor cost. The ultra high frequency detecting technology is a distant wireless communication technology; the system used to execute this technology consists of an electronic tag, a reader and an antenna. When the electronic tag enters an electromagnetic field region generated by antenna, the electronic tag is triggered by a wireless signal, and then the electronic tag transmits back an identification signal to the reader through the antenna, and then the reader reads the inner memory information from the electronic tag after confirming the identification signal.

Even though the ultra high frequency detecting technology is applied, however, the general operation method is that a person must open the cabinet door and take a radio frequency identification reader to read the electronic tags attached to products by swiping back and forth, such that the checking time is too long. In addition, the monitor system is requested during checking the expensive goods, such as jewelry, for security and the extra costs are increased. Moreover, since the triggering range and distance is not enough and the transmitting/receiving equipment is required for each receiving facility, so that even though there are some automatic triggering methods; the cost is still too high for practical application. Therefore, a facility which is costly cheaper and can reduce the checking time and staff costs is required.

SUMMARY OF THE INVENTION

An objective of the present invention to provide a the wireless radio frequency identification receiving facility having antenna net which includes a receiving apparatus having a plurality of receiving spaces for receiving objects with a radio frequency identification electronic tag thereon, a leaking-waved antenna net unit disposed in the receiving apparatus, and a first antenna disposed outside the receiving apparatus and connected to the leaking-waved antenna net unit. The leaking-waved antenna net unit includes an inner main antenna and a plurality of extension antennas which are connected or coupled to the inner main antenna and extended to the regions adjacent to the receiving spaces. The first antenna is connected to the inner main antenna, and used to receiving the detecting signal from a reader unit.

The first antenna generates a current while receiving a detecting signal from the reader unit, and an electromagnetic (EM) wave is generated due to the wave leaking while the current flows through the leaking-waved antenna net unit. Moreover, the EM wave is transmitted along the extension antennas, such that the radio frequency identification electronic tag on the objects is triggered by the electromagnetic field built up by the EM wave.

In addition, if each receiving space has a front cover to enclose the receiving spaces, and the front cover and walls of the receiving space are made of metal. In order to overcome the shielding effect and make the radio frequency identification electronic tag can be triggered by the electromagnetic field, forming an opening on each a wall of the receiving space, and the leaking-waved antenna net unit further comprises a plurality of end antennas connected to an extension antenna and passing through the openings. Therefore, the EM wave can be transmitted to the receiving spaces along the end antennas, and the radio frequency identification electronic tag can be triggered by the electromagnetic field which is built up by the EM wave.

Disposing a leaking-waved antenna net unit in a receiving apparatus and connecting the leaking-waved antenna net unit to an outer antenna, such that current can be transmitted from the first antenna to the inner main antenna, and EM waves can be transmitted along the inner main antenna and the extension antennas due to the surface wave-guiding effect formed of the wave leaking when the reader unit of staff transmits the detecting signal. Finally, the EM waves is transmitted to region adjacent to the receiving spaces, and the radio frequency identification electronic tags are triggered, and information of all objects in the receiving apparatus is read at one time, so that the checking time can be greatly reduced and the possibility of lost and position mistake of object can be excluded. In addition, the inner main antenna is a simple modification of coaxial cable, and the extension antennas and the end antennas can be conducting wires, the cost is cheaper, and has better competition ability in the market.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

The present invention may be embodied in various forms and the details of the preferred embodiments of the present invention will be described in the subsequent content with reference to the accompanying drawings. Modifications of the shape of the present invention shall too be considered to be within the spirit of the present invention.

Figure 1:
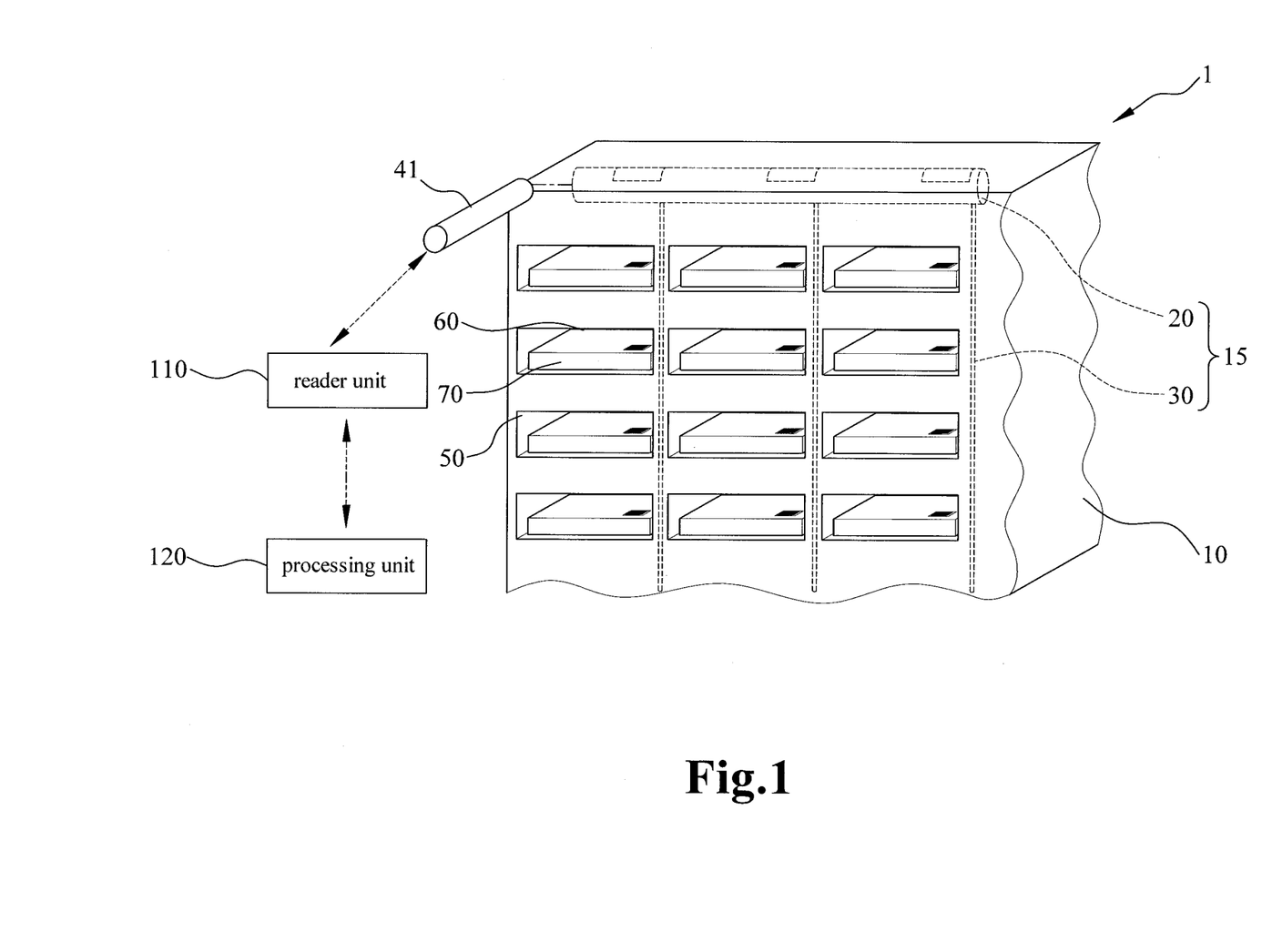
FIG. 1 illustrates a schematic drawing of a first embodiment of a wireless radio frequency identification (RFID) receiving facility having antenna net according to the present invention.

FIG. 1 illustrates a schematic drawing of the first embodiment of a wireless radio frequency identification (RFID) receiving facility having antenna net according to the present invention. As shown in FIG. 1, the first embodiment of the wireless radio frequency identification device 1 having antenna net according to the present invention includes a receiving apparatus 10, a leaking-waved antenna net unit 15 disposed in the receiving apparatus 10, and a first antenna 41 disposed outside the receiving apparatus 10 and connected to the leaking-waved antenna net unit 15. The receiving apparatus 10 defines a plurality of receiving spaces 50 for receiving objects 70 having a radio frequency identification electronic tag 60. A leaking-waved antenna net unit 15 is disposed in the receiving apparatus 10, and includes an inner main antenna 20 and a plurality of extension antennas 30. The inner main antenna 20 is connected to the first antenna 41, and the extension antennas 30 are connected or coupled to the inner main antenna 20 and each of them is extended to the regions adjacent to one line or one column of the receiving spaces 50.

The first antenna 41 generates a current when receiving a detecting signal from the reader unit 110 of staff, and an electromagnetic (EM) wave is generated due to the wave leaking while the current flows through the leaking-waved antenna net unit 15. Moreover, the EM wave is transmitted along the extension antennas 30, such that the radio frequency identification electronic tag 60 on the objects 70 is triggered by the electromagnetic field built up by the EM wave, and the information stored in the radio frequency identification electronic tag 60 is transmitted back to the reader unit 110 along the extension antennas 30, the inner main antenna 20 and the first antenna 41. Under this condition, reader unit 110 of staff can read information of all the objects 70 at one time, in addition, the reader unit 110 can further transmit the information of all the objects 70 in the receiving apparatus 10 to a processing unit 120 by cable, wireless, Bluetooth™, or infrared radiation, wherein the processing unit 120 is host or a programmable single IC.

Figure 2A:
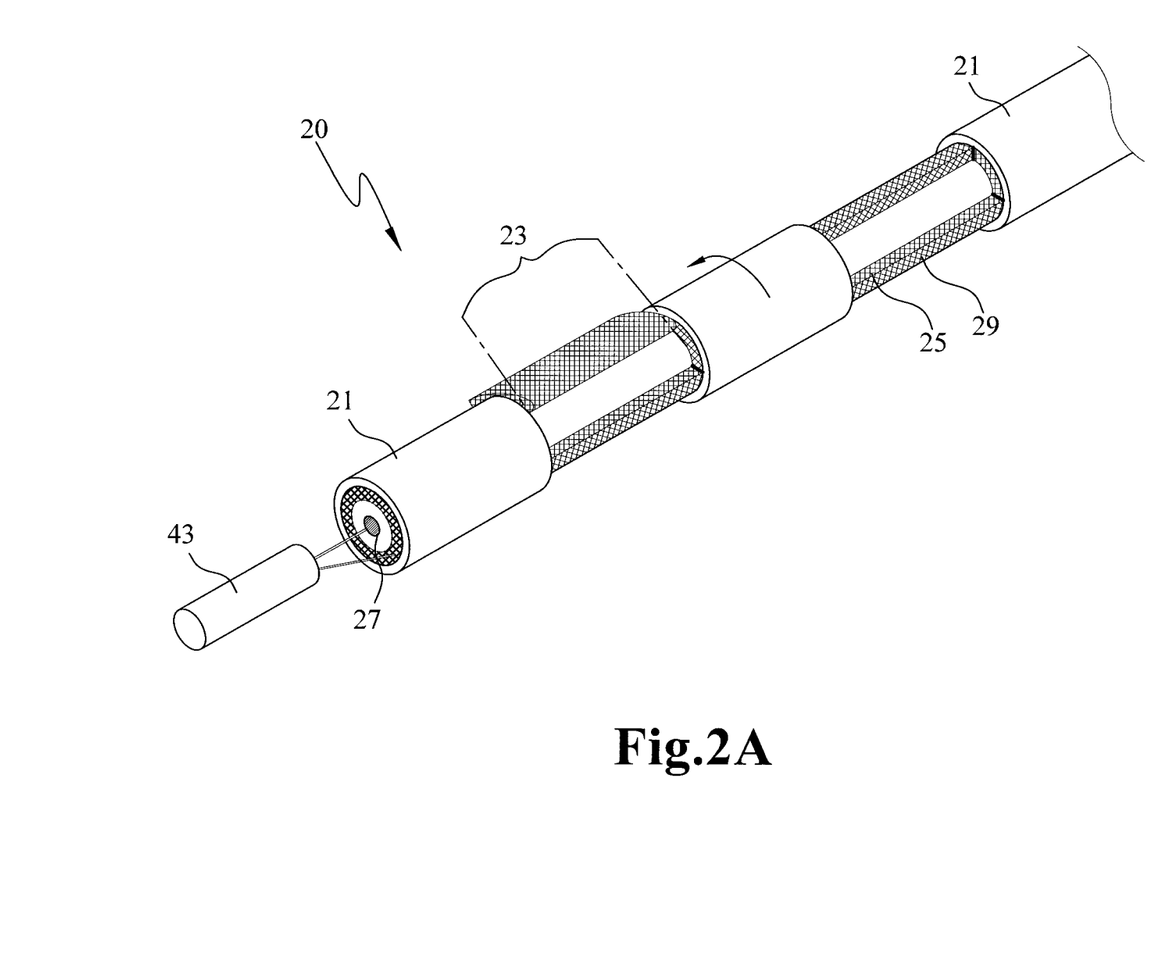
FIG. 2A illustrates a schematic drawing of an inner main antenna employed in the wireless radio frequency identification (RFID) receiving facility shown in FIG. 1.

FIG. 2A illustrates a schematic drawing of an inner main antenna employed in the wireless radio frequency identification (RFID) receiving facility shown in FIG. 1. As shown in FIG. 2A, the inner main antenna 20 includes a coaxial cable 21 and an end matching device 43. The coaxial cable 21 has at least one aperture region 23 without an outer conducting layer 25. The inner main antenna 20 is connected to the first antenna 41, the extension antennas 30 is connected or coupled to inner main antenna 20, and an inner conducting layer 27 and the outer conducting layer 25 are not contacted to and separated from each other by an insulating layer 29. The end matching device 43 is connected to the inner conducting layer 27 and the outer conducting layer 25 at one end of the coaxial cable 21, to form an opening path, a close path or a short circuit for the current in the coaxial cable 21.

In this embodiment, the extension antennas 30 are conducting wires, and are connected or coupled to the outer conducting layer 25 of the coaxial cable 21. When detecting signal is transmitted form the reader unit 110, the current generated by the first antenna 41 is transmitted to the inner conducting layer 27 of the inner main antenna 20, and the EM wave leaks out while the current flows through the aperture region 23 to build up an electromagnetic field, and the EM waves is transmitted along the outer conducting layer 25 and the extension antennas 30, such that the electromagnetic field is built adjacent to the receiving spaces 50. The effective range of the electromagnetic field is within a radius of 0 to 200 cm centered from the leaking-waved antenna net unit 15.

Figure 2B:
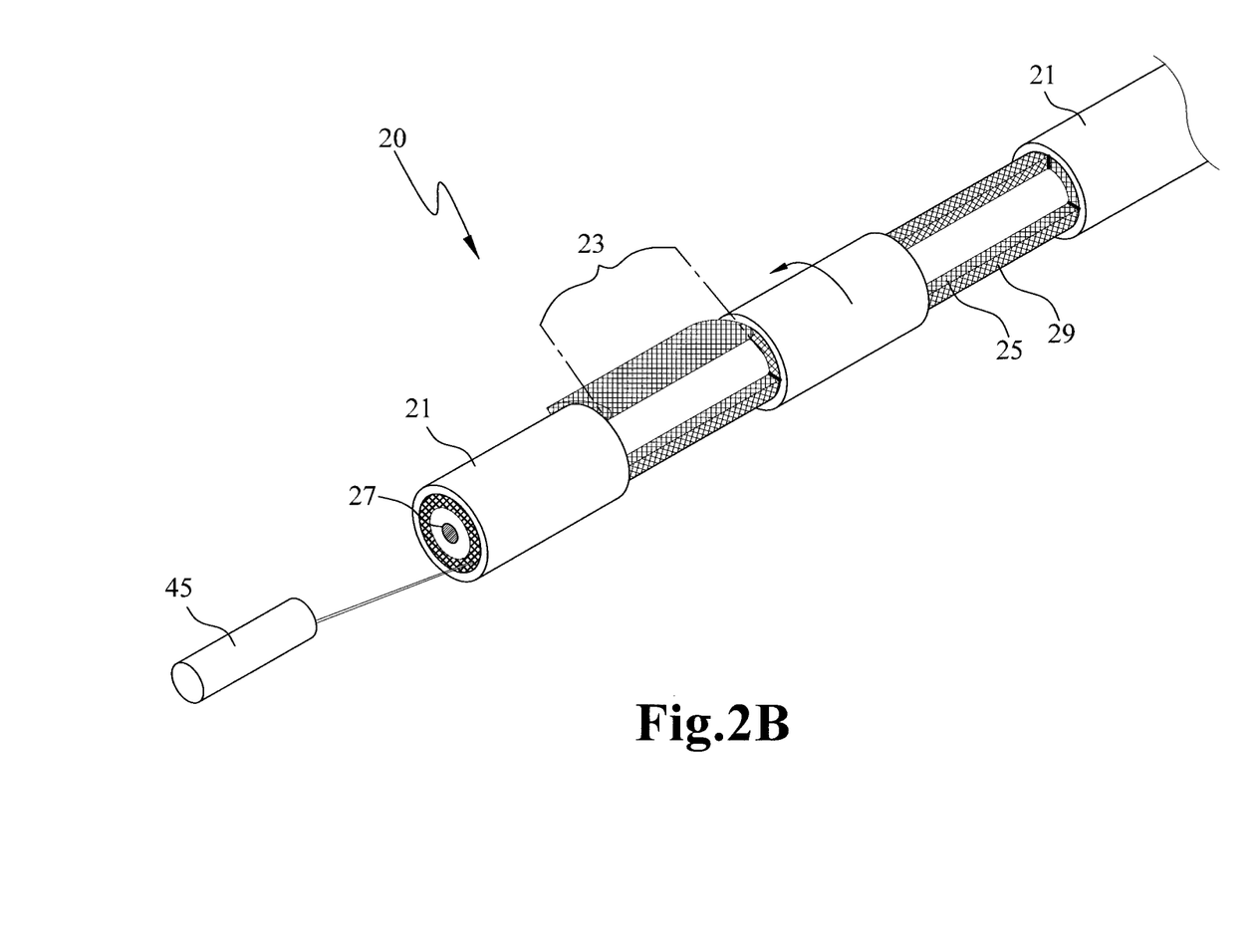
FIG. 2B illustrates a schematic drawing of a modified inner main antenna employed in the wireless radio frequency identification (RFID) receiving facility shown in FIG. 1.

FIG. 2B illustrates a schematic drawing of a modified inner main antenna employed in the wireless radio frequency identification (RFID) receiving facility shown in FIG. 1. As shown in FIG. 2B, inner main antenna in FIG. 2B is a modification of inner main antenna in FIG. 2A, and the inner main antenna 20 in FIG. 2B includes a coaxial cable 21 and a second antenna 45, the second antenna 45 is connected to the coaxial cable 21 for enhancing the radiation effect.

Figure 3:
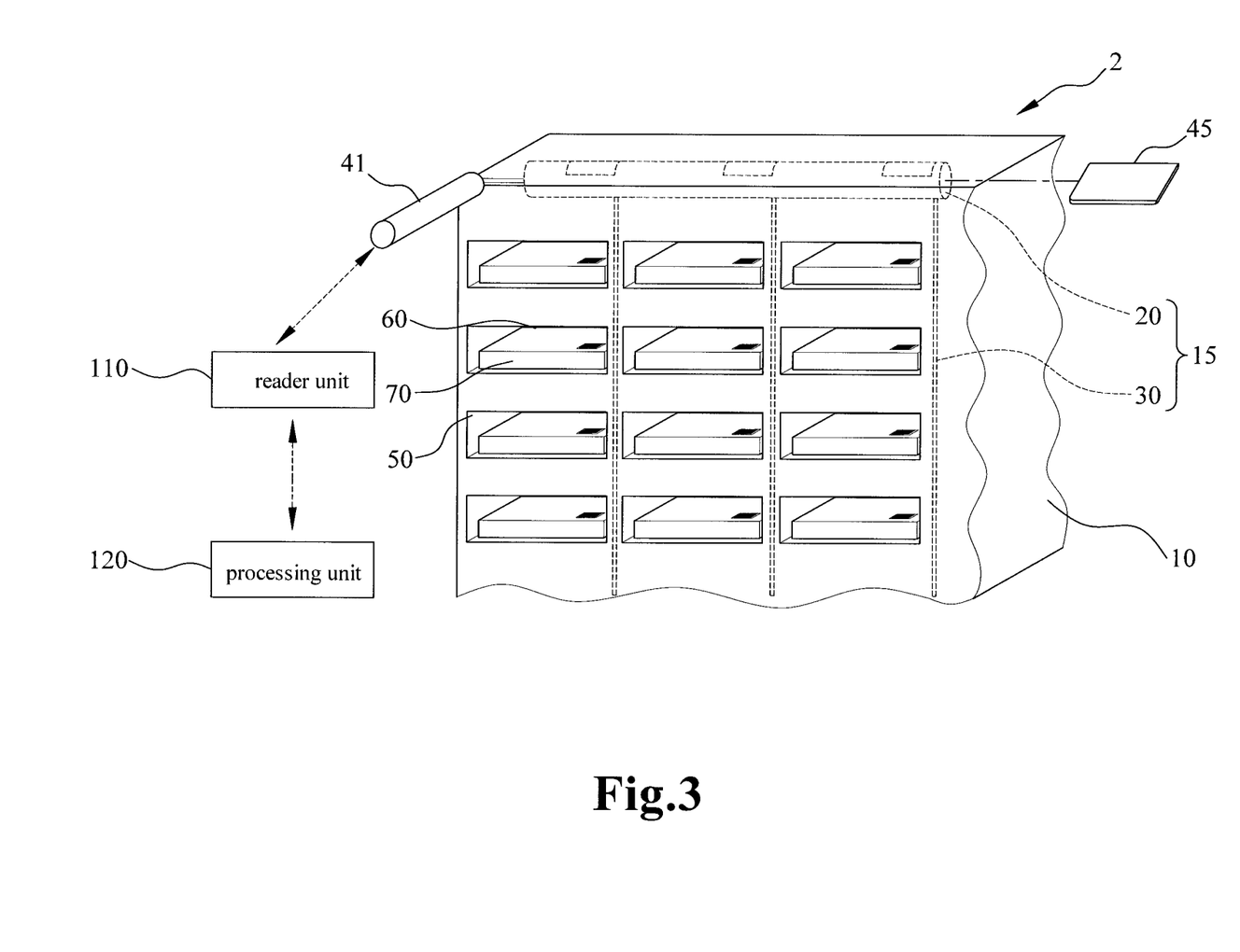
FIG. 3 illustrates a schematic drawing of a second embodiment of the wireless radio frequency identification receiving facility having antenna net according to the present invention.

FIG. 3 illustrates a schematic drawing of the second embodiment of the wireless radio frequency identification receiving facility having antenna net according to the present invention. As shown in FIG. 3, the second the embodiment of wireless radio frequency identification receiving facility having antenna net 2 has the second antenna 45 shown in FIG. 2B disposed outside the receiving apparatus 10. Staff can select one of first antenna 41 and second antenna 45 to transmit detecting signal by using reader unit 110. Moreover, EM wave is transmitted from the inner main antenna 20 to those extension antennas 30, and the radio frequency identification electronic tag 60 on the objects 70 is triggered by the electromagnetic field which is built up by the EM wave. Finally, the information stored in the radio frequency identification electronic tag 60 is transmitted to the reader unit 110 along the extension antennas 30, the inner main antenna 20 and the first antenna 41 or the second antenna 45, such that the reader unit 110 of staff can read all the information of the objects 70 in the receiving apparatus 10.

Figure 4A:
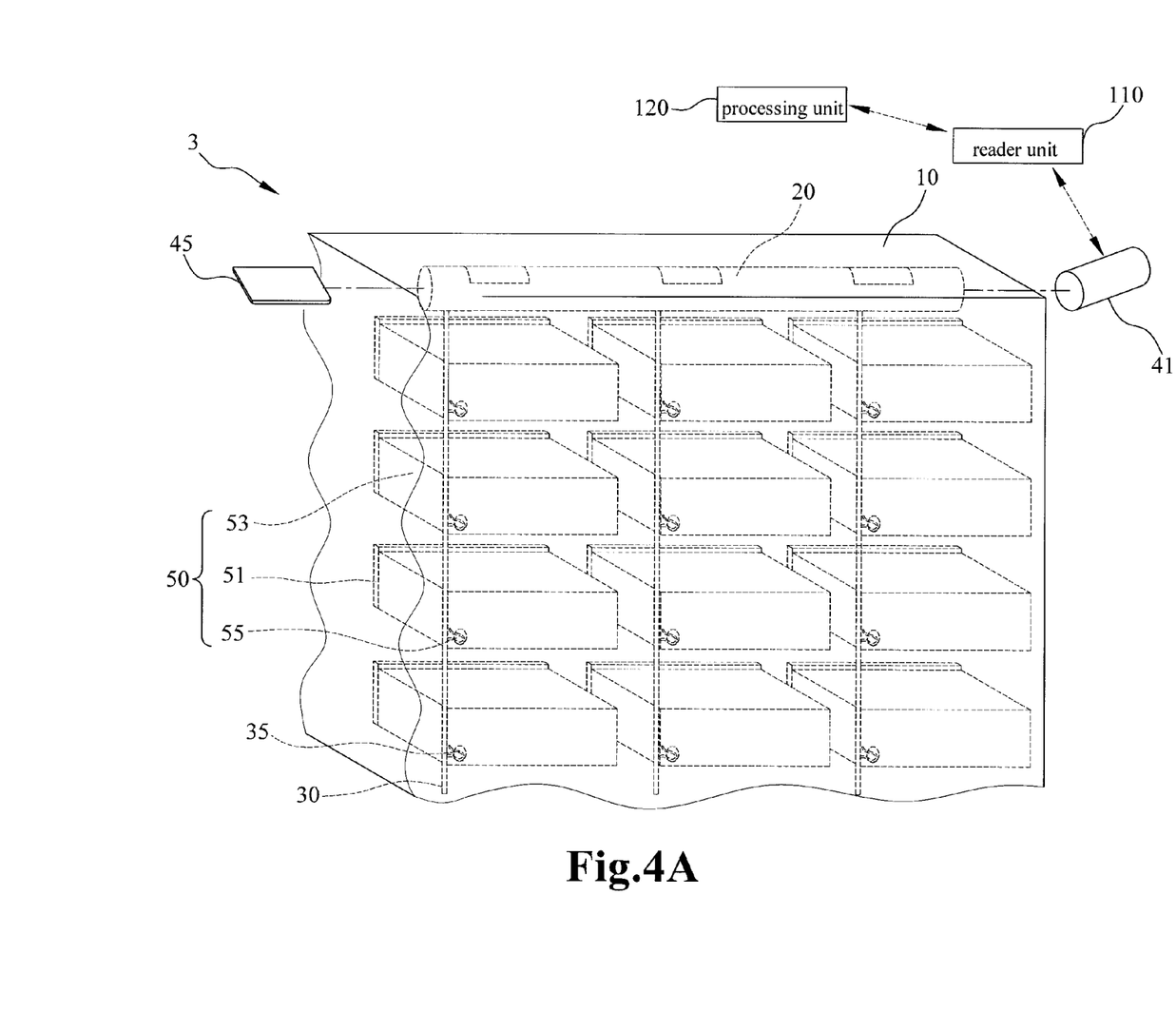
FIG. 4A illustrates a schematic drawing of a third embodiment of the wireless radio frequency identification receiving facility having antenna net according to the present invention.

FIG. 4A illustrates a schematic drawing of the third embodiment of a wireless radio frequency identification receiving facility having antenna net according to the present invention. As shown in FIG. 4A, the third embodiment of the wireless radio frequency identification receiving facility having antenna net 3 according the present invention is similar to the wireless radio frequency identification receiving facility having antenna net 1 of the first embodiment. The only difference resides in that each receiving space 50 has a front cover 51 to enclose the receiving spaces 50, and the front cover 51 and walls 53 of the receiving space 50 are made of metal, such as a safe, and the radio frequency identification electronic tag 60 on the object 70 received in the receiving space 50 can not be triggered by the electromagnetic field due to the shielding effect. In order to eliminate the problem, the third embodiment of the wireless radio frequency identification receiving facility having antenna net 3 according to the present invention, an opening 55 is formed through each wall 53 of the receiving space 50, and the leaking-waved antenna net unit 15 further includes a plurality of end antennas 35 connected to an extension antenna 30 and passes through the openings 55, wherein the end antennas 35 can be conducting wires. Therefore, the EM wave can be transmitted to the receiving spaces 50 along the end antennas 35, and the radio frequency identification electronic tag 60 can be triggered by the electromagnetic field, which is built up by the EM wave.

Figure 4B:
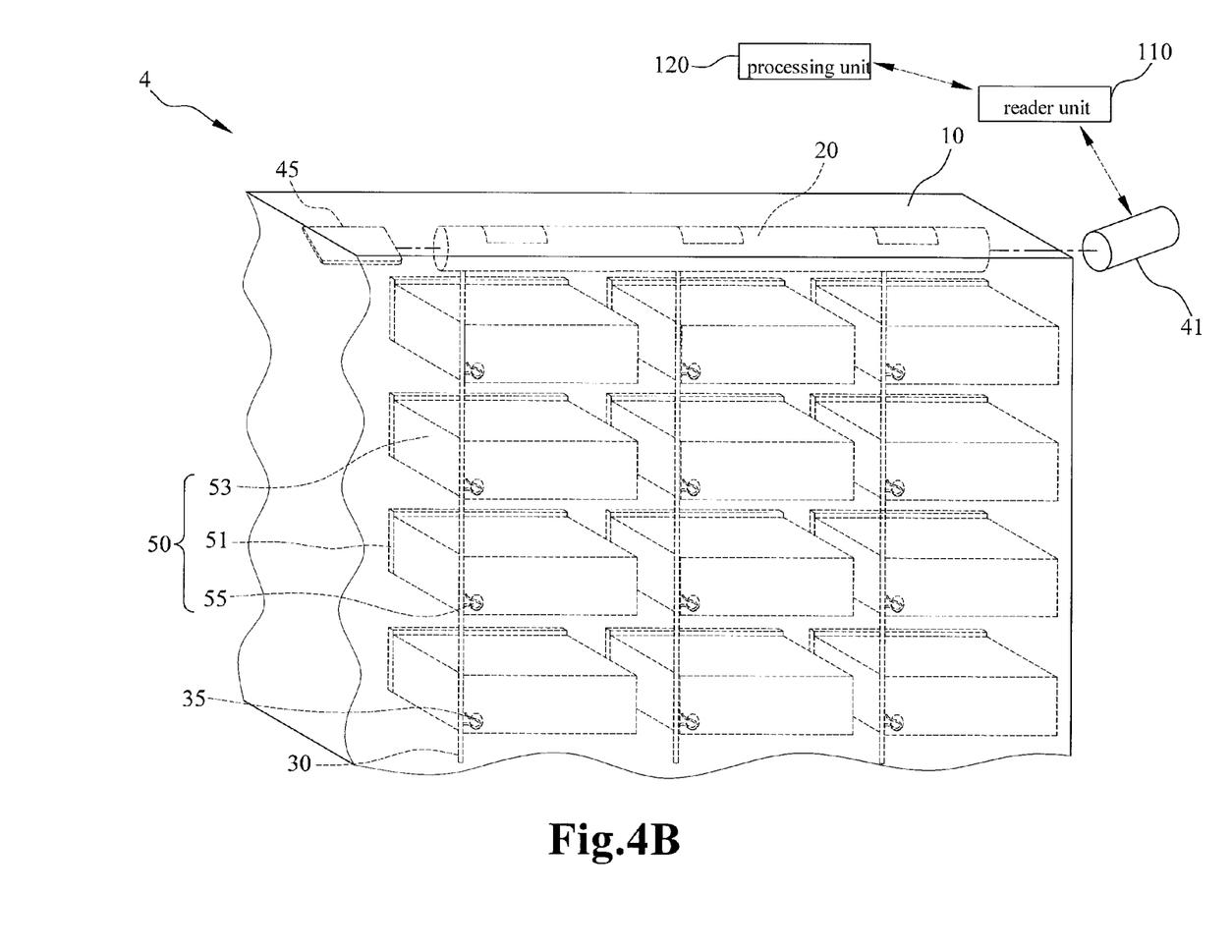
FIG. 4B illustrates a schematic drawing of a fourth embodiment of the wireless radio frequency identification receiving facility having antenna net according to the present invention.

FIG. 4B illustrates a schematic drawing of the fourth embodiment of a wireless radio frequency identification receiving facility having antenna net according to the present invention. As shown in FIG. 4B, the fourth embodiment of the wireless radio frequency identification receiving facility having antenna net 4 according to present invention is similar to the wireless radio frequency identification receiving facility having antenna net 2 of the second embodiment in structure. Also similar to the third embodiment of the wireless radio frequency identification receiving facility having antenna net 3, each receiving space 50 has a front cover 51 to enclose the receiving spaces 50, the front cover 51 and walls 53 of the receiving space 50 are made of metal. An opening 55 is formed through the wall 53 of the receiving space 50, and the leaking-waved antenna net unit 15 further includes a plurality of end antennas 35 connected to an extension antenna 30 and passing through an opening 55, wherein the end antennas 35 can be conducting wires. The second antenna 45 is disposed outside the receiving apparatus 10 and staff can select one of first antenna 41 and second antenna 45 to transmit a detecting signal by using reader unit 110. Then, EM wave is transmitted from the inner main antenna 20 to those extension antennas 30 and end antennas 35, and the radio frequency identification electronic tag 60 on the objects 70 is triggered by the electromagnetic field which is built up by the EM wave. Finally, the information stored in the radio frequency identification electronic tag 60 is transmitted to the reader unit 110 along the end antennas 35, the extension antennas 30, the inner main antenna 20 and the first antenna 41 or the second antenna 45, such that the reader unit 110 of staff can read all the information of the objects 70 in the receiving apparatus 10 at one time.

The technical features of the present invention is that disposing a leaking-waved antenna net unit in a receiving apparatus and connecting the leaking-waved antenna net unit to an outer antenna. When the reader unit of staff transmits the detecting signal, the EM waves can be transmitted to region adjacent to the receiving spaces along the inner main antenna, the extension antennas, and the end antennas due to the surface wave-guiding effect formed of the wave leaking. The radio frequency identification electronic tags are triggered, and information of all objects in the receiving apparatus is read at one time, so that the checking time can be greatly reduced and the possibility of lost and position mistake of object can be excluded. In addition, the inner main antenna is a simple modification of coaxial cable, and the extension antennas and the end antennas can be conducting wires, the cost is cheaper, and has better competition ability in the market.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wireless radio frequency identification receiving facility having antenna net, comprising:
   a receiving apparatus defining a plurality of receiving spaces, wherein each of the receiving spaces is used for receiving an object with a radio frequency identification electronic tag;
   a leaking-waved antenna net unit disposed in the receiving apparatus and including an inner main antenna and a plurality of extension antennas connected or coupled to the inner main antenna and extended to the regions adjacent to the receiving spaces; and
   a first antenna disposed outside the receiving apparatus and connected to the leaking-waved antenna net unit for receiving a detecting signal from a reader unit,
   wherein the first antenna generates a current while receiving the detecting signal from a reader unit, and an electromagnetic wave is formed while the current flows through the leaking-waved antenna net unit, and the electromagnetic wave is transmitted along the extension antennas, and the radio frequency identification electronic tags on the objects are triggered by the electromagnetic field built up by the electromagnetic wave.

2. The wireless radio frequency identification receiving facility having antenna net as claimed in claim 1, wherein the inner main antenna includes a coaxial cable having at least one aperture region without an outer conducting layer, the coaxial cable is connected to the first antenna, the extension antennas are connected or coupled to the coaxial cable, and an insulating layer of the coaxial cable is disposed between the outer conducting layer and an inner conducting layer of the coaxial cable in order to isolate there between;
   when the reader unit transmits the detecting signal, the current generated by the first antenna and flowing along the inner conducting layer of the coaxial cable flows through the at least one aperture region, and an electromagnetic wave leaks out and an electromagnetic field is built up, and the electromagnetic wave is transmitted to regions adjacent to the receiving spaces along the conducting layer of the coaxial cable and the extension antennas, and information stored in the radio frequency identification electronic tag is transmitted back to the reader unit along the extension antennas, the inner main antennas and the first antenna.

3. The wireless radio frequency identification receiving facility having antenna net as claimed in claim 2, wherein the inner main antenna further comprises an end matching device connected to the inner conducting layer and the outer conducting layer at one end of the coaxial cable to form an opening path, a close path or a short circuit for the current in the coaxial cable.

4. The wireless radio frequency identification receiving facility having antenna net as claimed in claim 2, further comprises a second antenna disposed outside the receiving apparatus and connected to the coaxial cable, and when the reader unit transmits the detecting signal to the first antenna or the second antenna, the current generated by the first antenna or the second antenna and flowing along the inner conducting layer of the coaxial cable flows through the at least one aperture region, and an electromagnetic wave leaks out and an electromagnetic field is built up, and the electromagnetic wave is transmitted to regions adjacent to the receiving spaces along the conducting layer of the coaxial cable and the extension antennas, such that information stored in the radio frequency identification electronic tag is transmitted back to the reader unit along the extension antennas, the inner main antennas and the first antenna or the second antenna.

5. The wireless radio frequency identification receiving facility having antenna net as claimed in claim 2, wherein the inner main antenna further comprises a second antenna connected to the coaxial cable.

6. The wireless radio frequency identification receiving facility having antenna net as claimed in claim 1, wherein an effective range of the electromagnetic field is within a radius of 0 to 200 cm centered from the leaking-waved antenna net unit.

7. The wireless radio frequency identification receiving facility having antenna net as claimed in claim 1, wherein the extension antennas are conducting wires.

8. A wireless radio frequency identification receiving facility having antenna net, comprising:
   a receiving apparatus defining a plurality of receiving spaces, wherein each of the receiving spaces is used to receiving an object with a radio frequency identification electronic tag, each of the receiving spaces has a front cover for enclosing thereof, the front cover and walls of the receiving spaces made of metal, and an opening is formed through one of the walls of the receiving spaces;
   a leaking-waved antenna net unit disposed in the receiving apparatus and including an inner main antenna, a plurality of extension antennas connected or coupled to the inner main antenna and extended to the regions adjacent to the receiving spaces and a plurality end antennas connected to the extension antennas and each of the end antennas passing through the opening of each of the receiving spaces; and a first antenna disposed outside the receiving apparatus and connected to the leaking-waved antenna net unit for receiving a detecting signal from a reader unit, wherein the first antenna generates a current while receiving the detecting signal from the reader unit, and an electromagnetic wave is formed while the current flows through the leaking-waved antenna net unit, and the electromagnetic wave is transmitted along the extension antennas and the end antennas to the receiving spaces, and the radio frequency identification electronic tags on the objects are triggered by the electromagnetic field built up by the electromagnetic wave.

9. The wireless radio frequency identification receiving facility having antenna net as claimed in claim 8, wherein the inner main antenna includes a coaxial cable having at least one aperture region without an outer conducting layer, the coaxial cable is connected to the first antenna, the extension antennas are connected or coupled to the coaxial cable, and an insulating layer of the coaxial cable is disposed between the outer conducting layer and an inner conducting layer of the coaxial cable in order to isolate there between;

when the reader unit transmits the detecting signal, the current generated by the first antenna and flowing along the inner conducting layer of the coaxial cable flows through the at least one aperture region, and an electromagnetic wave leaks out and an electromagnetic field is built up, and the electromagnetic wave is transmitted to the receiving spaces along the conducting layer of the coaxial cable, the extension antennas and the end antennas, and information stored in the radio frequency identification electronic tag is transmitted back to the reader unit along the end antennas, the extension antennas, the inner main antennas and the first antenna.

10. The wireless radio frequency identification receiving facility having antenna net as claimed in claim 9, wherein the inner main antenna further comprises an end matching device connected to the inner conducting layer and the outer conducting layer at one end of the coaxial cable to form an opening path, a close path or a short circuit for the current in the coaxial cable.

11. The wireless radio frequency identification receiving facility having antenna net as claimed in claim 9, further comprises a second antenna disposed outside the receiving apparatus and connected to the coaxial cable, and when the reader unit transmits the detecting signal to the first antenna or the second antenna, the current generated by the first antenna or the second antenna and flowing along the inner conducting layer of the coaxial cable flows through the at least one aperture region, and an electromagnetic wave leaks out and an electromagnetic field is built up, and the electromagnetic wave is transmitted to the receiving spaces along the conducting layer of the coaxial cable, the extension antennas, and the end antennas, such that information stored in the radio frequency identification electronic tag is transmitted back to the reader unit along the extension antennas, the inner main antennas and the first antenna or the second antenna.

12. The wireless radio frequency identification receiving facility having antenna net as claimed in claim 9, wherein the inner main antenna further comprises a second antenna connected to the coaxial cable.

13. The wireless radio frequency identification receiving facility having antenna net as claimed in claim 8, wherein an effective range of the electromagnetic field is within a radius of 0 to 200 cm centered from the leaking-waved antenna net unit.

14. The wireless radio frequency identification receiving facility having antenna net as claimed in claim 8, wherein the extension antennas and the end antennas are conducting wires.

* * * * *